(12) United States Patent
Reichert et al.

(10) Patent No.: US 7,886,196 B2
(45) Date of Patent: Feb. 8, 2011

(54) FAST DETECTION OF PROCESS OUTAGES

(75) Inventors: Wolfgang Reichert, Weil im Schonbuch (DE); Volker Schoelles, Schoenaich (DE)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 12/325,450

(22) Filed: Dec. 1, 2008

(65) Prior Publication Data

US 2010/0138189 A1 Jun. 3, 2010

(51) Int. Cl.
*G06F 11/00* (2006.01)
(52) U.S. Cl. ........................................................ 714/39
(58) Field of Classification Search .................. 714/18, 714/26, 37–39, 41, 45–47, 57
See application file for complete search history.

(56) References Cited

U.S. PATENT DOCUMENTS

| | | | |
|---|---|---|---|
| 6,269,478 B1 * | 7/2001 | Lautenbach-Lampe et al. | 717/127 |
| 6,640,203 B2 * | 10/2003 | Brown et al. | 702/186 |
| 6,754,890 B1 * | 6/2004 | Berry et al. | 717/128 |
| 6,760,903 B1 * | 7/2004 | Morshed et al. | 717/130 |
| 7,058,629 B1 * | 6/2006 | Colrain et al. | 710/200 |
| 7,114,104 B1 * | 9/2006 | Bennett | 714/38 |
| 2004/0268317 A1 * | 12/2004 | Gouriou et al. | 717/130 |
| 2006/0190453 A1 * | 8/2006 | Colrain et al. | 707/8 |

\* cited by examiner

*Primary Examiner*—Nadeem Iqbal
(74) *Attorney, Agent, or Firm*—Cantor Colburn LLP; Diane Roberts-Gerhardt (57) ABSTRACT

A method for process monitoring with an automation manager includes: obtaining a unique process identifier (pid) of a to be monitored application process; calling an operating system using a system call function from a monitoring process; wherein the system call function adds the monitoring process to a list of interested processes of one or more to be monitored application processes; wherein the to be monitored application processes are not child processes of the monitoring process; waiting of the monitoring process until the operating system notifies the monitoring process, that the unique pid of the to be monitored process is no longer available; wherein in the event the unique pid of the to be monitored process is no longer available: notifying the automation manager that the to be monitored application process associated with the unique pid has terminated; and wherein interested processes are the monitoring processes that have called the system call function.

19 Claims, 6 Drawing Sheets

FAST DETECTION OF PROCESS OUTAGES

BACKGROUND

This invention relates generally to process monitoring software, and more particularly to providing a method and system for the fast detection of process outages in a server environment. Examples of processes monitored for outages include: application processes, operating system processes, and tool processes.

Computer servers are used extensively throughout industry for Internet servers, application servers, database servers, communication servers, and other mission critical enterprise system components. Computer servers configured for the aforementioned activities and applications require a high level of availability. A high level of availability requires the minimization of server downtime that results from abnormal or premature terminations of programs and processes. Server downtime leads to loss of sales, lower productivity, and unreliable communications. In order to minimize server downtime, process monitoring software is employed to detect abnormal and premature terminations of programs and processes.

An existing approach to maintaining a high level of availability of computer servers is the use of automation managers. An automation manager is a software component operating in the field of computing resource management, which may comprise the management of software resources as well as hardware resources. Information technology (IT) systems often employ a variety of automation managers to automate the handling of the system's vast quantity of resources. For example, a high-availability automation manager may be configured to check the availability of an application (e.g., software resource), and trigger recovery actions when an error occurs. A performance manager may monitor the application's performance data and may dynamically adjust application usage based on performance objectives. A provisioning manager may dynamically change systems able to interact with software resources and/or a set of software resources that are available to interact with. Resources, such as a software resource, may be on a stand-alone computing system, or on more complex systems, such as distributed computing environment, autonomic environments, clustered computing environments, virtual computing environments, etc.

Automation managers provide high availability and policy-based automation for applications and services across heterogeneous environments. An automation manager helps to meet high levels of availability and prevent service disruptions for critical applications. Having knowledge about dependencies between applications, automation managers initiate, execute and coordinate the starting, stopping, restarting in place, and fail over (restart on a different machine) of individual application components or entire composite applications to help reduce the frequency and duration of incidents that impact IT availability.

A basic prerequisite for automation is availability monitoring. The automation manager identifies applications, programs or resources (which are to be monitored) by process identifiers (pid). A pid is a unique positive integer assigned or associated to a process by the operating system, and is not reused until the process lifetime ends. Additionally, pids are utilized internally by processes to communicate.

The automation manager monitors processes via their pid. In the event a pid is no longer available, it is inferred that an associated application has terminated. For an application termination that is unexpected, such as a process failure, the automation manager reacts immediately to re-activate the application (restart in place or fail over to a standby node). The faster the automation manager detects the failure, the faster the application may be made available again. Fast detection is an important factor in achieving high application availability.

In order for an automation manager to manage an application, the automation manager requires, at a minimum, the following three pieces of information: a start command, a stop command, and a monitoring method. A standard monitoring method is starting the 'to be monitored' application process as a child process of the monitoring process and putting the monitoring process into a wait state. By starting the child process the monitoring process becomes the parent of that application process. It is standard operating system behavior to inform the parent (which is the monitoring process) in case the child terminates via sending a signal to the parent that wakes it up from its wait state. Then the monitoring process notifies in turn the automation manager. It is noted that this ONLY works for this parent/child process relationship. Other monitoring processes may be active, which cannot be the parent of a 'to be monitored application process'. Such monitoring processes are 'interested processes' in the sense that they also want to be informed by the operating system when a 'to be monitored' process ends.

A more general standard monitoring method checks periodically whether a specific program is running by checking if the pid is active. An operating system (e.g. UNIX, Linux, Windows, etc.) maintains a list of all running/active processes.

Table 1 illustrates a typical UNIX/Linux process table. The process table has an application with process name "progA" that has been started by a user "jane" with an associated process id of 1716, and an application with process name "progB" that has been started by user "jim" with an associated process id of 1725. On Unix/Linux systems the process list may be shown via a ps ("process status") command.

TABLE 1

| USER | PID | CMD |
| --- | --- | --- |
| jane | 1716 | progA |
| jim | 1725 | progB |

The automation manager may also use a program interface (system call) instead of the ps command for process monitoring. A program interface is usually faster than the ps command and provides for a process table in binary format. Once a pid has been identified, the automation manager may subsequently check via a system call whether the process associated with the pid is still running.

Figure 1:
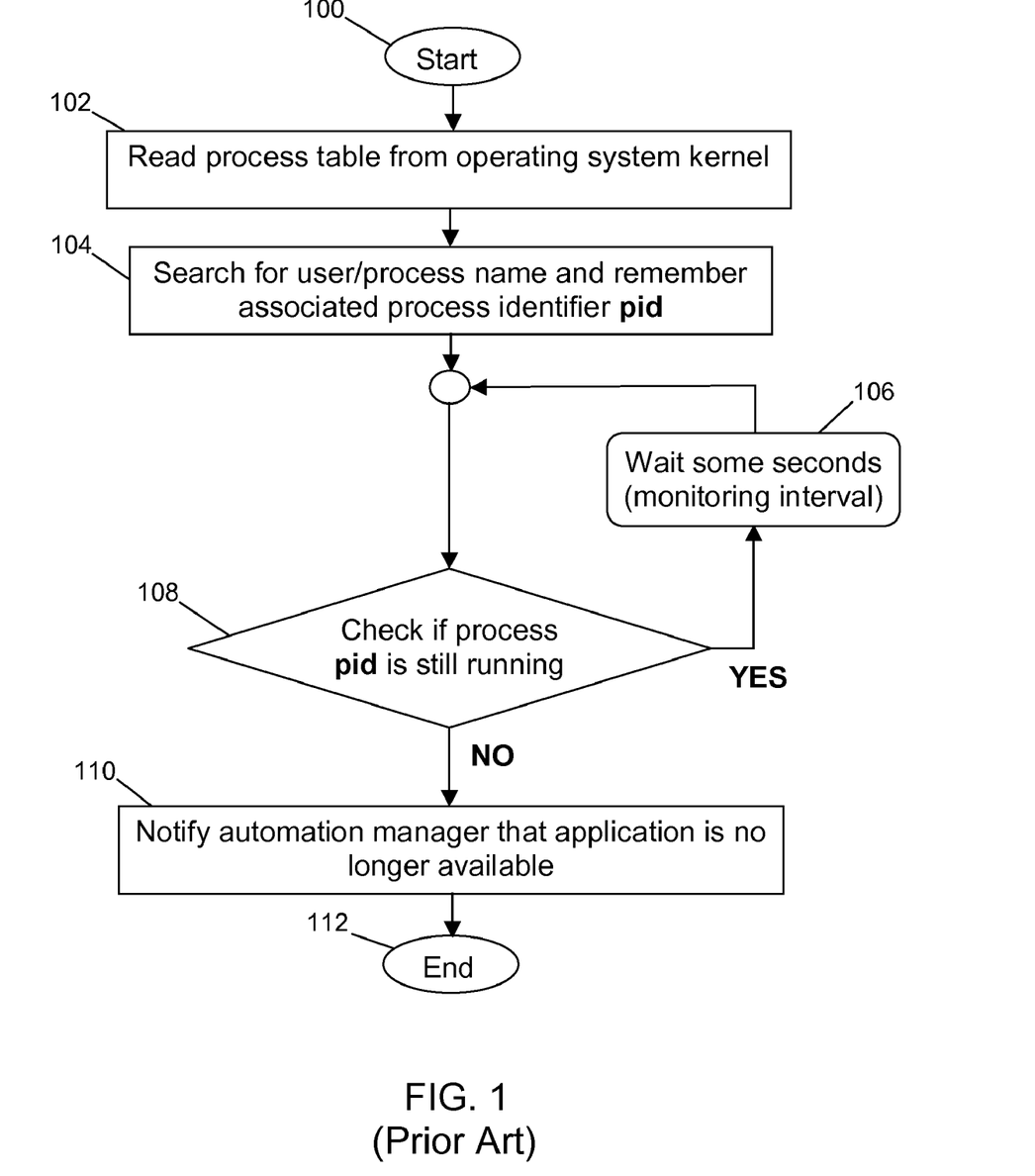
FIG. 1 is a flow chart of an existing method for standard process monitoring with an automation manager.

FIG. 1 is a flow chart of an existing method for standard process monitoring with an automation manager. The automation manager has the following parameters: a process name, user name, and a monitoring interval. For example from Table 1, the process name is "progA", the user name is "jane", and the monitoring interval is 30 seconds. The monitoring method starts (block 100) with reading a process table from an operating system kernel (block 102). A kernel is the essential center of a computer operating system. A kernel acts as a core or nucleus that provides basic services for all other parts of the operating system. Kernel is a term used most frequently in UNIX and Linux operating systems, though similar concept exists in other operating systems under different terminology. Typically, a kernel (or any comparable center of an operating system) includes an interrupt handler that handles all requests or completed I/O operations that compete for the kernel's services, a scheduler that determines which programs share the kernel's processing time in what order, and a supervisor that actually gives use of the computer to each process when it is scheduled. A kernel may also include a manager of the operating system's address spaces in memory or storage, sharing these among all components and other users of the kernel's services. A kernel's services are requested by other parts of the operating system or by application programs through a specified set of program interfaces sometimes known as system calls.

Continuing with FIG. 1, the monitoring method of the automation manager searches for a user/process name in the process table, and retrieves and remembers an associated process identifier pid of the process to be monitored (block 104). There are other existing means to obtain the pid that is associated with the application. For example, the application itself may store the associated pid in a file, which is read by the automation manager.

The monitoring method determines (checks) if the pid is still active or running (decision block 108). In the event the pid is still running (decision block 108 is yes), the monitoring method continues to check the process table (block 108) at the defined monitoring interval (block 106). In the event the pid is no longer running (decision block 108 is No), the monitoring method notifies the automation manager that the application identified with the user/process name and associated pid is no longer available (block 110), and the monitoring method concludes (block 112).

SUMMARY

Embodiments of the present invention include a method, article, and system for process monitoring with an automation manager, the method includes: obtaining a unique process identifier (pid) of a to be monitored application process; calling an operating system using a system call function from a monitoring process; wherein the system call function adds the monitoring process to a particular list of interested processes of one or more to be monitored application processes; wherein the one or more to be monitored application processes are not child processes of the monitoring process; waiting of the monitoring process until the operating system notifies the monitoring process, that the unique pid of the to be monitored process is no longer available; wherein in the event the unique pid of the to be monitored process is no longer available: notifying the automation manager that the to be monitored application process associated with the unique pid has terminated; and wherein interested processes are the monitoring processes that have called the system call function.

An article comprising one or more computer-readable storage media containing instructions that when executed by a computer enables a method for process monitoring with an automation manager, the method includes: obtaining a unique process identifier (pid) of a to be monitored application process; calling an operating system using a system call function from a monitoring process; wherein the system call function adds the monitoring process to a particular list of interested processes of one or more to be monitored application processes; wherein the one or more to be monitored application processes are not child processes of the monitoring process; waiting of the monitoring process until the operating system notifies the monitoring process, that the unique pid of the to be monitored process is no longer available; wherein in the event the unique pid of the to be monitored process is no longer available: notifying the automation manager that the to be monitored application process associated with the unique pid has terminated; and wherein interested processes are the monitoring processes that have called the system call function.

A system for process monitoring with an automation manager, the system includes: one or more computing and communication devices in communication through a network to one or more computer servers; wherein the one or more computer servers are configured to do the following: obtain a unique process identifier (pid) of a to be monitored application process; call an operating system using a system call function from a monitoring process; wherein the system call function adds the monitoring process to a particular list of interested processes of one or more to be monitored application processes; wherein the one or more to be monitored application processes are not child processes of the monitoring process; waiting of the monitoring process until the operating system notifies the monitoring process, that the unique pid of the to be monitored process is no longer available; wherein in the event the unique pid of the to be monitored process is no longer available: notifying the automation manager that the to be monitored application process associated with the unique pid has terminated; and wherein interested processes are the monitoring processes that have called the system call function.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The existing methods for standard process monitoring with an automation manager have many disadvantages:
  a) Parent/child monitoring cannot be used for 'non-child' process relationships.
  b) Use of periodic monitoring cannot detect process failures immediately, since process failures are only detected at the monitoring interval. In addition, the monitoring of hundreds/thousands of processes utilizes a tremendous amount of central processing unit (CPU) resources, and therefore the monitoring interval cannot be set too small. A smaller monitoring interval increases the number of monitoring cycles in a given period of time, which increases the amount of required processing resources from the CPU.

Embodiments of the invention provide a method and system for the fast detection of process outages in a server environment. Embodiments of the invention enhance the current operating system process table, which is always memory resident, and the standard C/C++ waitpid( ) function (or a similar notification method for process termination). Embodiments of the invention determine application availability without the need for a short monitoring or polling interval of a few seconds that consumes valuable CPU resources. Embodiments of the invention may be configured for operating systems including Unix, Linux, Windows, z/OS, or other known operating systems.

Figure 2:
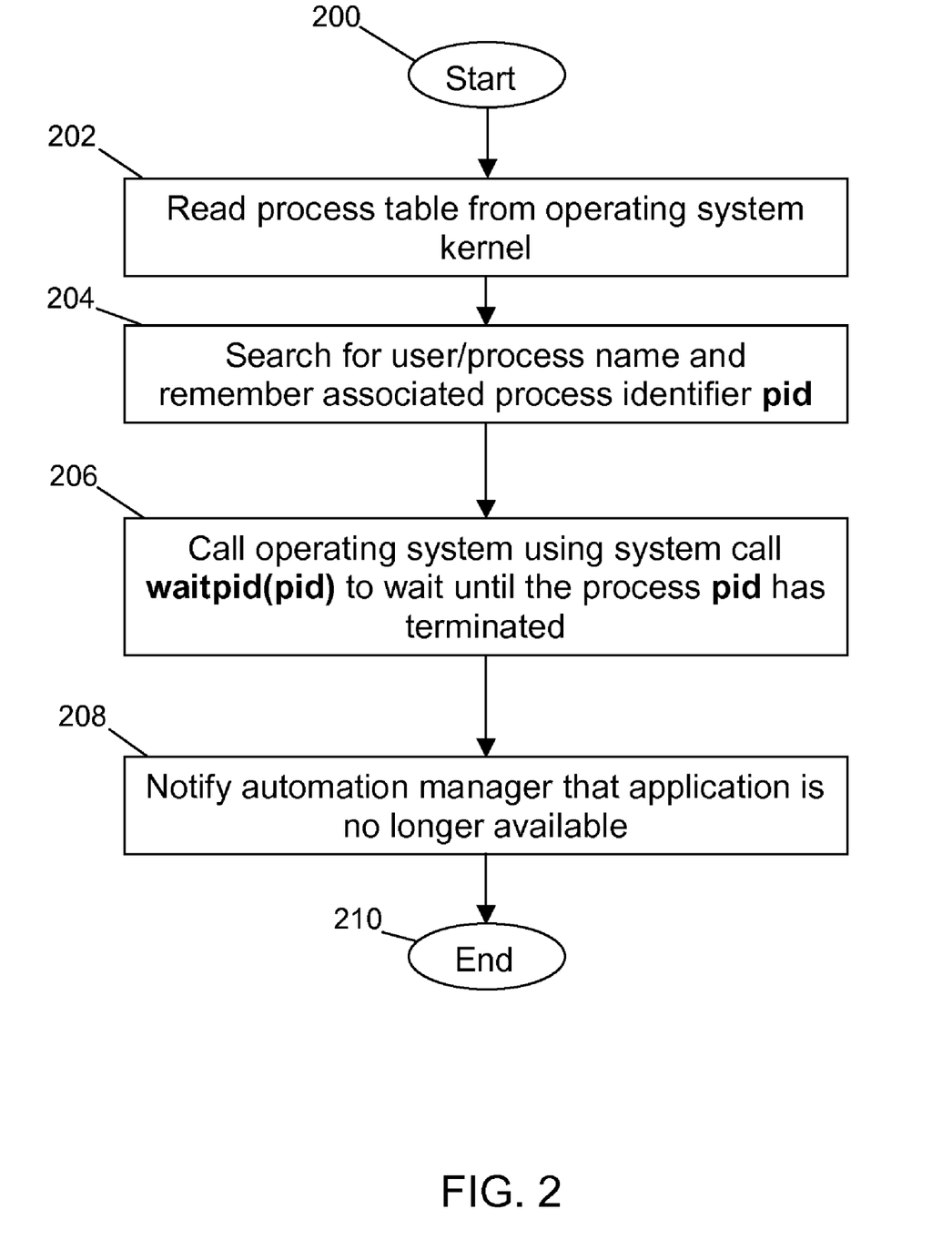
FIG. 2 is a flow chart of a method for standard process monitoring with an automation manager according to embodiments of the invention.

FIG. 2 is a flow chart of a method for standard process monitoring with an automation manager according to embodiments of the invention. In embodiments of the invention, the automation manager has the following parameters: a process name, and a user name. In embodiments of the invention a monitoring interval is no longer applicable for the detection of a process outage. For example from Table 1, the process name is "progA", and the user name is "jane". The monitoring method of the automation manager starts (block 200) with reading a process table from an operating system kernel (block 202), and searching for a user/process name in the process table, and retrieves and remembers an associated process identifier pid of a process to be monitored (block 204). In an alternative embodiment of the invention, the pid that is associated with the application process may be retrieved by different means. For example, the application process to be monitored stores an associated pid in a file, which is read by the automation manager. The monitoring method subsequently calls the operating system using a system call in the form of a waitpid(pid) function to wait until the process pid has terminated (block 206). In the event the application identified with the user/process name and associated pid is no longer available (terminated), the waitpid( ) function returns control to the monitoring method, which now can immediately notify the automation manager (block 208) and the monitoring method concludes (block 210).

The waitpid( ) function puts the monitoring routine asleep. When a process pid terminates, the monitoring routine regains control. Thus, in the event a process terminates, because of an application failure, the process's termination is detected immediately, and in response recovery actions may be started by the application manager.

The existing standard C/C++ waitpid(pid) function is restricted to pid that are child processes, and does not work for arbitrary processes in the system. A child process is a process that has been spawned from a parent process. A child process is one level lower in the process hierarchy than its parent process. The existing waitpid(pid) function allows the calling thread to obtain status information for one of its child processes. The calling thread suspends processing until status information is available for the specified child process, if the options argument is 0. A suspended waitpid( ) function call may be interrupted by the delivery of a signal whose action is either to run a signal-catching function or to terminate the process. When the waitpid( ) is successful, status information about how the child process ended (for example, whether the process ended normally) is stored in the location specified by stat_loc argument.

However, in embodiments of the invention the functionality of the waitpid(pid) function is enhanced, or a new function is introduced, to allow the caller of waitpid(pid) to register for waiting for of any process, not just child processes. In embodiments of the invention, the functionality of the enhanced waitpid(pid) function, or the new function is implemented in the operating system kernel. The kernel has control over all processes and knows which resources (e.g., memory areas, locks) are owned by the process. In embodiments of the invention, in the event a process terminates, the kernel makes sure that all resources are cleaned up, and also ensures that the parent process is informed of the child's termination. The enhanced waitpid(pid) or the new function of embodiments of the invention may be added as a new entry to the kernel process information.

In embodiments of the invention, a system call waitpid (pid) adds the caller's process id (the process id of the monitoring routine "pidMon") to the kernel process information of the pid (the "to be monitored" process). In embodiments of the invention, there is no limitation to a single caller, and multiple monitoring routines (interested processes) may register on the same pid. In addition, one monitoring routine may register for multiple pids. In the event a process pid terminates, the kernel wakes up all waiting processes, and sends a signal to activate or "wake up" waiting processes.

Figure 3:
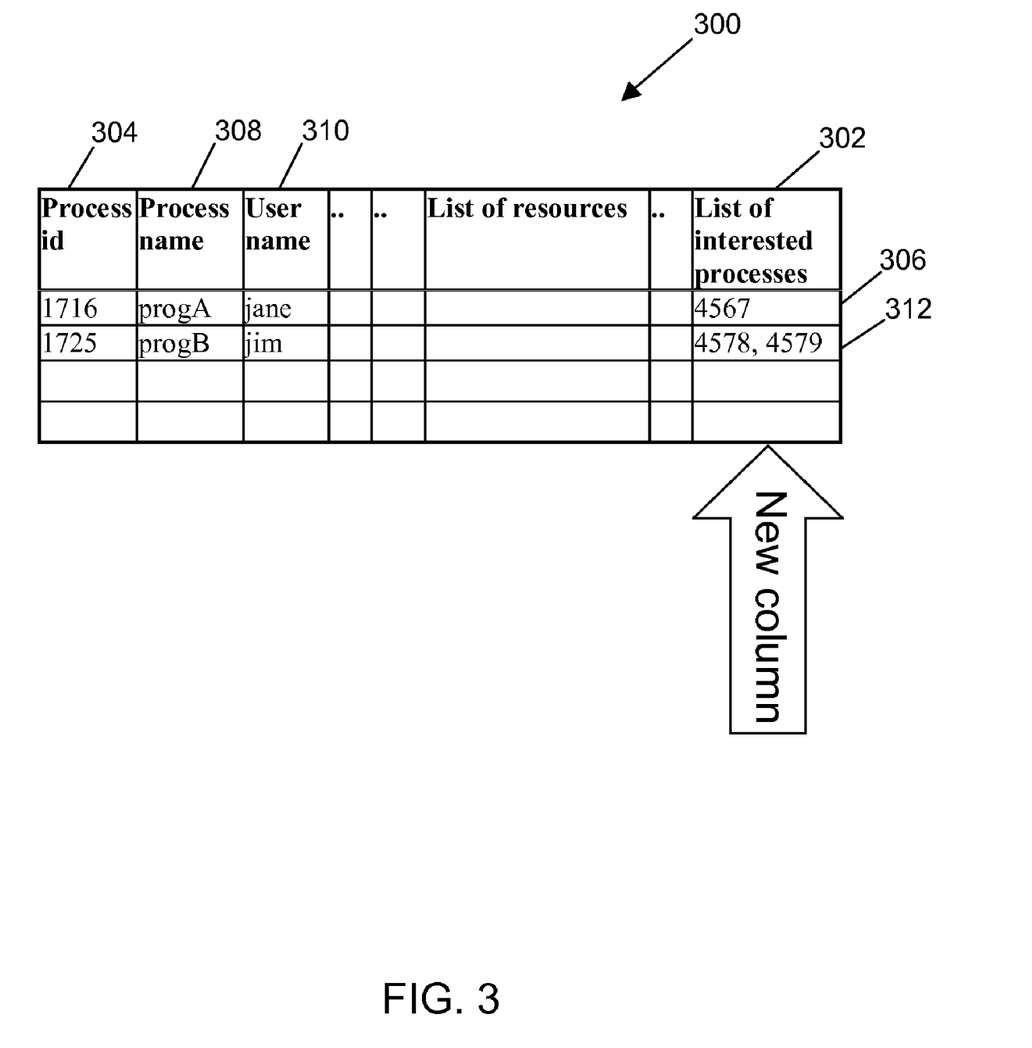
FIG. 3 illustrates an enhanced kernel process table according to embodiments of the invention.

FIG. 3 illustrates an enhanced kernel process table 300 according to embodiments of the invention. Process table 300 is an extension to the process list maintained by the operating system kernel, and has an additional column 302 referred to as a "List of interested processes". Interested processes are monitoring processes that have called the waitpid( ) function. Interested processes are monitoring processes that are interested in obtaining notification that a process has ended or terminated. In the example shown in FIG. 3, a monitoring process "4567" in additional column 302 has registered via system call waitpid(1716) that has associated process id 1716 (column 304), which are both in row 306. In addition, a process name (column 308), and a user name (column 310) is also identified in row 306 that corresponds to the associated process id 1716. Row 312 has two interested processes (4578, 4579) identified in column 302 that have registered to monitor process id 1725. It is noted that interested process 4567 is not the parent of process id 1716, and interested processes 4578 and 4579 are not parents to process id 1725.

Figure 4:
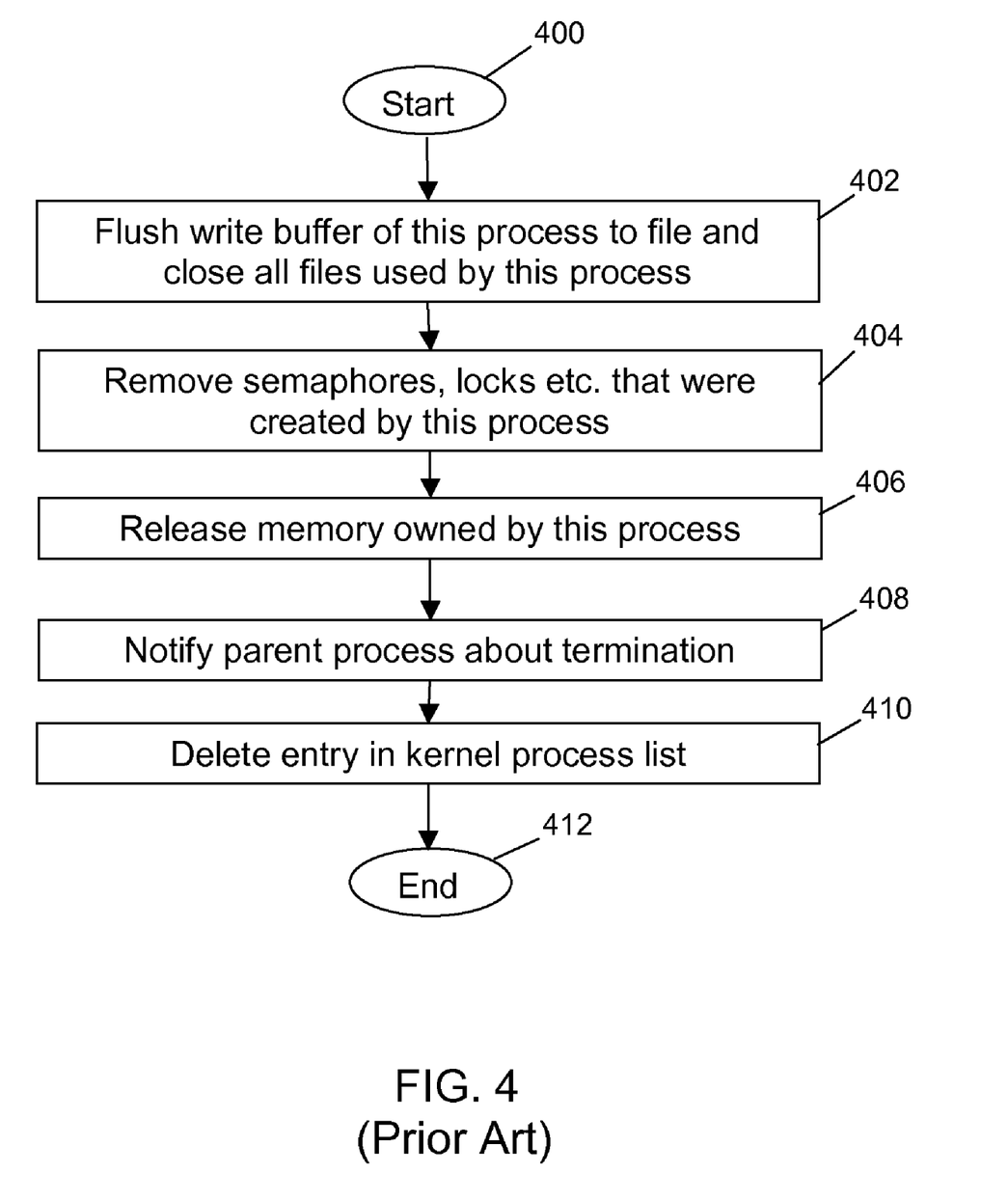
FIG. 4 is a flow chart of an existing method for process exit handling by an operating system (OS) kernel.

FIG. 4 illustrates a flow chart of an existing method for process exit handling by an operating system (OS) kernel. The actual implementation and sequence of actions may vary among different operating systems. In the event a process ends or terminates, a kernel performs the following actions. The process starts (block 400) with the flushing of a write buffer of the terminated process to a file, and closing all files used by the terminated process (block 402); the removal of semaphores, locks, etc., which were created by the terminated process (block 404), and releasing memory owned by the terminated process (block 406); notifying the parent process about the termination of the process (block 408); deleting the terminated process' entry in the kernel's process list (block 410), and concluding the process (block 412).

Figure 5:
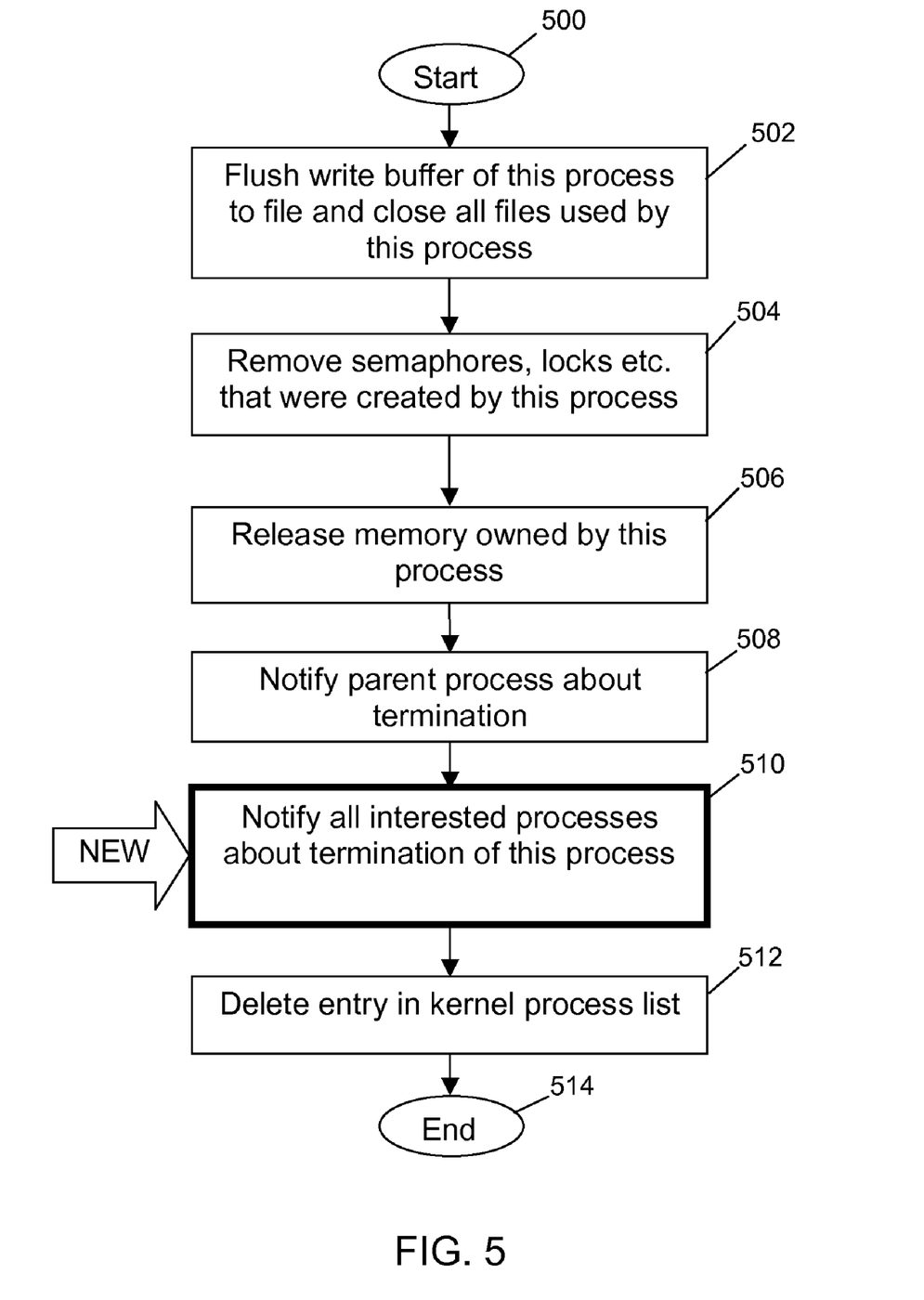
FIG. 5 is a flow chart of a method for process exit handling by an operating system (OS) kernel according to embodiments of the invention.

FIG. 5 is a flow chart of a method for process exit handling by an operating system (OS) kernel according to embodiments of the invention. It is noted that the operating system may be Unix or Linux based, Windows based, z/OS based, or may be other known operating systems. An additional step is added to the process exit handling by the OS kernel of notifying interested processes, which are those processes that have registered as interested processes to get notification on process exit. The interest process have called the waitpid( ) function or an equivalent function that resulted in an entry in the "list of interested processes" for a particular process id. In the event a process ends or terminates, a kernel performs the following actions according to embodiments of the invention. The process starts (block 500) with the flushing a write buffer of the terminated process to a file, and closing all files used by the terminated application process (block 502); the removal of semaphores, locks, etc., which were created by the terminated application process (block 504), and releasing memory owned by the terminated application process (block 506); notifying a parent process about the termination of the application process (block 508), and all interested processes about the termination of the application process (block 510); deleting the terminated process's entry in the kernel's process list (block 512), and concluding the process (block 514).

Assuming a monitoring method has identified pid as process id of the application to be monitored. It invokes waitpid (pid) to register as interested process for process pid. The waitpid( ) function causes the monitoring method to sleep until the particular process pid ends. The exit handling by the OS kernel finds the monitoring method as interested process and wakes it up. So the monitoring method gains control when process pid ends and immediately notifies the automation manager that the corresponding application is no longer available.

In an additional embodiment, a function is configured to register multiple processes at once, such as a regsignal(<signal>, pid1, pid2, pid3, . . . ). However, it is noted that a different name for the function may be used as well. A monitoring routine is 'woken up' in the event one of the processes in the list has terminated. In this case, the monitoring routine has to check which of the processes has terminated. That can be determined by checking which pid was responsible for the wake up. For example, notification may be provided via a signal such as a kernel sending a signal SIGCHLD in the event one of the listed processes terminates or a similar notification method for process termination may be used. Also instead of the existing signal SIGCHLD a new signal can be introduced like SIGPSTP. The monitor routine therefore registers itself to the kernel for the listed processes: regsignal (SIGCHLD, pid1, pid2, pid3). The monitoring routine may do any work (or can sleep). The monitoring routine receives a signal when one of the processes in the list has terminated. The signal information may contain the pid of the terminated process and further information (e.g., reason for termination).

Figure 6:
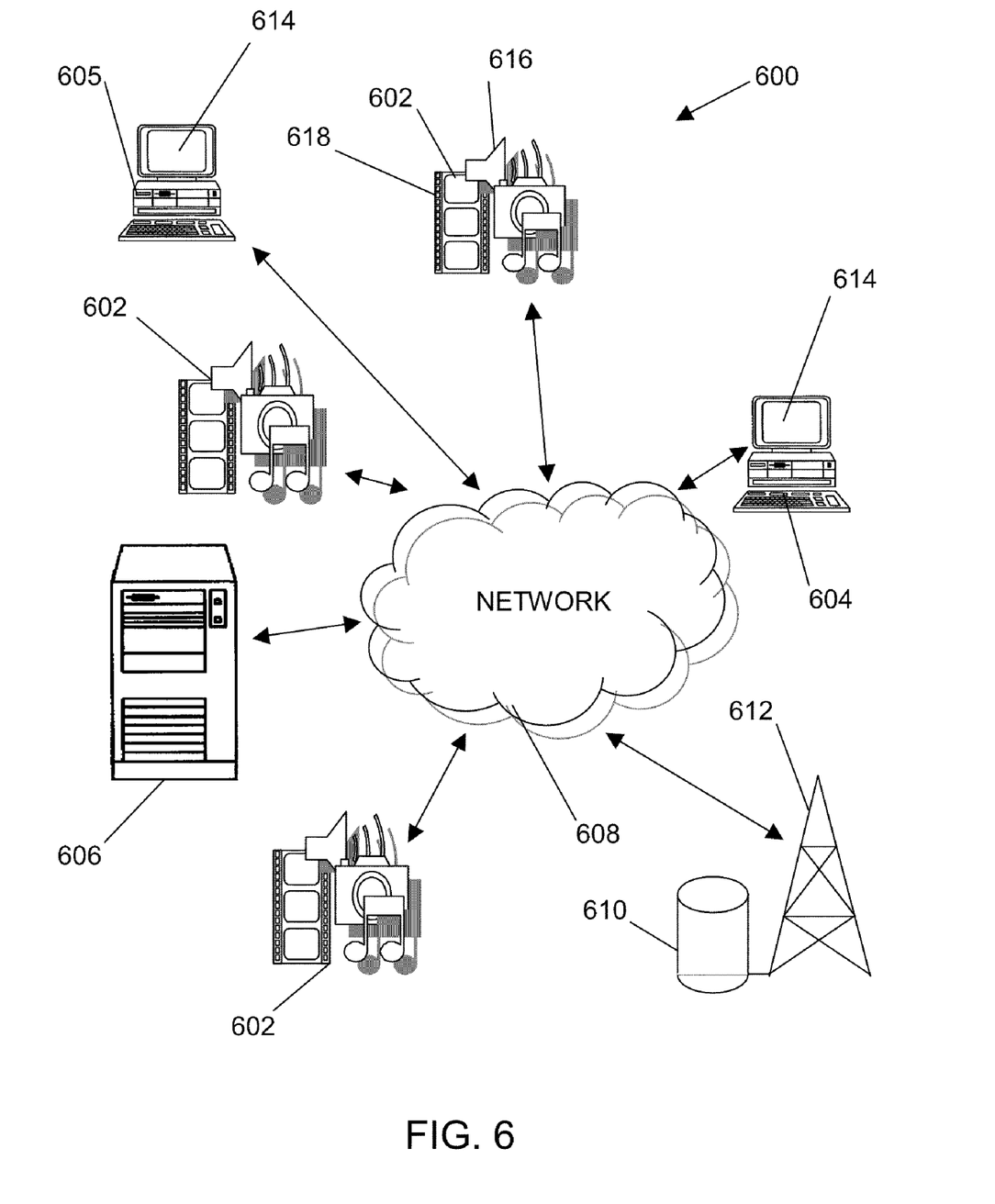
FIG. 6 illustrates a system for implementing embodiments of the invention.

FIG. 6 illustrates a system 600 for implementing embodiments of the invention. The system 600 includes remote devices including one or more multimedia/communication devices 602 equipped with speakers 616 for implementing the audio, as well as display capabilities 618 for facilitating the graphical user interface (GUI) aspects of the present invention, including the display of the enhanced process table. In addition, mobile computing devices 604 and desktop computing devices 605 equipped with displays 614 for use with the GUI of the present invention are also illustrated. The remote devices 602 and 604 may be wirelessly connected to a network 608. The network 608 may be any type of known network including a local area network (LAN), wide area network (WAN), global network (e.g., Internet), intranet, etc. with data/Internet capabilities as represented by server 606. Communication aspects of the network are represented by cellular base station 610 and antenna 612. Each remote device 602 and 604 may be implemented using a general-purpose computer executing computer programs. The computer programs may be resident on a storage medium local to the remote devices 602 and 604, or maybe stored on the server system 606 or cellular base station 610. The process monitoring software for the fast detection of process outages is resident on the server system 606. The server system 606 may belong to a public service. The remote devices 602 and 604, and desktop device 605 may be coupled to the server system 606 through multiple networks (e.g., intranet and Internet) so that not all remote devices 602, 604, and desktop device 605 are coupled to the server system 606 via the same network. The remote devices 602, 604, desktop device 605, and the server system 606 may be connected to the network 608 in a wireless fashion, and network 608 may be a wireless network. In a preferred embodiment, the network 608 is a LAN and each remote device 602, 604 and desktop device 605 executes a user interface application (e.g., web browser) to contact the server system 606 through the network 608. Alternatively, the remote devices 602 and 604 may be implemented using a device programmed primarily for accessing network 608 such as a remote client.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

The invention claimed is:

1. A method for process monitoring with an automation manager, wherein the method comprises:
    obtaining a unique process identifier (pid) of a to be monitored application process;
    calling an operating system using a system call function from a monitoring process;
    wherein the system call function adds the monitoring process to a particular list of interested processes of one or more to be monitored application processes;
    wherein the one or more to be monitored application processes are not child processes of the monitoring process;
    waiting of the monitoring process until the operating system notifies the monitoring process, that the unique pid of the to be monitored process is no longer available;
    wherein in the event the unique pid of the to be monitored process is no longer available:

notifying the automation manager that the to be monitored application process associated with the unique pid has terminated; and wherein interested processes are the monitoring processes that have called the system call function.

2. The method of claim 1, wherein obtaining the unique process identifier (pid) of the to be monitored application process further comprises:

reading an enhanced process table from an operating system kernel;

wherein the enhanced process table comprises one or more process identifiers (pid), process names, user names, and a list of interested processes for each of the one or more pid;

searching for a user name, process name; and determining the unique pid of the to be monitored application process in the enhanced process table.

3. The method of claim 1, wherein obtaining the unique process identifier (pid) of the to be monitored application process further comprises:

reading a file written by the to be monitored application process; and wherein the file contains the unique pid.

4. The method of claim 1, wherein in the event the to be monitored application process associated with the unique pid has terminated, the following exit handling occurs:

flushing a write buffer of the terminated application to a file;

closing all files used by the terminated application;

removing semaphores and locks created by the terminated application;

releasing memory owned by the terminated application;

notifying a parent process, and all the monitoring processes in the interested processes list about the termination of the application; and deleting the terminated application's entry in the enhanced process table.

5. The method of claim 1, wherein the system call function is a waitpid( ) function; and wherein the waitpid( ) function is configured for waiting for of any process, not just child processes.

6. The method of claim 1, wherein the interested processes are monitoring routines;

wherein multiple monitoring routines can register on the same pid; and wherein a single monitoring routine can register on a plurality of pid.

7. An article comprising one or more computer-readable storage media containing computer readable instructions that, when executed by a computer, performs a method for process monitoring with an automation manager, wherein the method comprises:

obtaining a unique process identifier (pid) of a to be monitored application process;

calling an operating system using a system call function from a monitoring process;

wherein the system call function adds the monitoring process to a particular list of interested processes of one or more to be monitored application processes;

wherein the one or more to be monitored application processes are not child processes of the monitoring process;

waiting of the monitoring process until the operating system notifies the monitoring process, that the unique pid of the to be monitored process is no longer available;

wherein in the event the unique pid of the to be monitored process is no longer available:

notifying the automation manager that the to be monitored application process associated with the unique pid has terminated; and wherein interested processes are the monitoring processes that have called the system call function.

8. The article of claim 7, wherein obtaining the unique process identifier (pid) of the to be monitored application process further comprises:

reading an enhanced process table from an operating system kernel;

wherein the enhanced process table comprises one or more process identifiers (pid), process names, user names, and a list of interested processes for each of the one or more pid;

searching for a user name, process name; and determining the unique pid of the to be monitored application process in the enhanced process table.

9. The article of claim 7, wherein obtaining a unique process identifier (pid) of a to be monitored application process further comprises:

reading a file written by the to be monitored application process; and wherein the file contains the unique pid.

10. The article of claim 7, wherein in the event the to be monitored application process associated with the unique pid has terminated, the following exit handling occurs:

flushing a write buffer of the terminated application to a file;

closing all files used by the terminated application;

removing semaphores and locks created by the terminated application;

releasing memory owned by the terminated application;

notifying a parent process, and all the monitoring processes in the interested processes list about the termination of the application; and deleting the terminated application's entry in the enhanced process table.

11. The article of claim 7, wherein the system call function is a waitpid( ) function; and wherein the waitpid( ) function is configured for waiting for of any process, not just child processes.

12. The article of claim 7, wherein the interested processes are monitoring routines;

wherein multiple monitoring routines can register on the same pid; and wherein a single monitoring routine can register on a plurality of pid.

13. A system for process monitoring with an automation manager, the system comprising:

one or more computing and communication devices in communication through a network to one or more computer servers;

wherein the one or more computer servers are configured to do the following:

obtain a unique process identifier (pid) of a to be monitored application process;

call an operating system using a system call function from a monitoring process;

wherein the system call function adds the monitoring process to a particular list of interested processes of one or more to be monitored application processes;

wherein the one or more to be monitored application processes are not child processes of the monitoring process;

waiting of the monitoring process until the operating system notifies the monitoring process, that the unique pid of the to be monitored process is no longer available;

wherein in the event the unique pid of the to be monitored process is no longer available:

notifying the automation manager that the to be monitored application process associated with the unique pid has terminated; and wherein interested processes are the monitoring processes that have called the system call function.

14. The system of claim 13, wherein the unique process identifier (pid) of the to be monitored application process is obtained by:

reading an enhanced process table from an operating system kernel;

wherein the enhanced process table comprises one or more process identifiers (pid), process names, user names, and a list of interested processes for each of the one or more pid;

searching for a user name, process name; and determining the unique pid of the to be monitored application process in the enhanced process table.

15. The system of claim 13, wherein the unique process identifier (pid) of the to be monitored application process is obtained by:

reading a file written by the to be monitored application process; and wherein the file contains the unique pid.

16. The system of claim 13, wherein in the event the to be monitored application process associated with the unique pid has terminated, the following exit handling occurs:

flushing a write buffer of the terminated application to a file;

closing all files used by the terminated application;

removing semaphores and locks created by the terminated application;

releasing memory owned by the terminated application;

notifying a parent process, and all the monitoring processes in the interested processes list about the termination of the application; and deleting the terminated application's entry in the enhanced process table.

17. The system of claim 13, wherein the system call function is a waitpid( ) function; and wherein the waitpid( ) function is configured for waiting for of any process, not just child processes.

18. The system of claim 13, wherein the interested processes are monitoring routines;

wherein multiple monitoring routines can register on the same pid; and wherein a single monitoring routine can register on a plurality of pid.

19. The system of claim 13, wherein a graphical user interface is configured to display of the enhanced process table.

\* \* \* \* \*